United States Patent
Aoki et al.

(10) Patent No.: US 7,628,650 B2
(45) Date of Patent: Dec. 8, 2009

(54) SHIELD SHELL UNIT WITH A PROJECTING FIXING PORTION

(75) Inventors: Eiji Aoki, Makinohara (JP); Tomokazu Yamane, Makinohara (JP); Takeaki Kaneko, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/257,479

(22) Filed: Oct. 24, 2008

(65) Prior Publication Data

US 2009/0126985 A1    May 21, 2009

(30) Foreign Application Priority Data

Nov. 15, 2007   (JP) ............................. 2007-296220

(51) Int. Cl.
*H01R 13/648* (2006.01)
(52) U.S. Cl. ................................. 439/607.28
(58) Field of Classification Search ......... 439/607–610, 439/350, 352; 174/72; 361/118
See application file for complete search history.

(56) References Cited

U.S. PATENT DOCUMENTS

| | | | |
|---|---|---|---|
| 5,718,605 A * | 2/1998 | Morikawa et al. ........... | 439/607 |
| 6,066,003 A * | 5/2000 | Chang ........................ | 439/607 |
| 6,206,731 B1 * | 3/2001 | Kuo ....................... | 439/607.44 |
| 6,352,438 B1 * | 3/2002 | Wu .............................. | 439/92 |
| 6,419,529 B1 * | 7/2002 | Shi et al. ..................... | 439/701 |
| 6,551,117 B2 * | 4/2003 | Poplawski et al. ............ | 439/92 |
| 6,863,545 B2 * | 3/2005 | Peloza ......................... | 439/79 |
| 6,909,339 B2 * | 6/2005 | Yonekura et al. ............ | 333/134 |
| 6,991,493 B2 * | 1/2006 | Matsui et al. ............... | 439/579 |
| 7,083,471 B2 * | 8/2006 | Hayashi ....................... | 439/610 |
| 7,168,987 B1 * | 1/2007 | Morohoshi et al. ..... | 439/607.18 |
| 2002/0048994 A1 * | 4/2002 | Oota et al. .................. | 439/607 |
| 2004/0057187 A1 * | 3/2004 | Kuboshima et al. ......... | 361/118 |

FOREIGN PATENT DOCUMENTS

JP         2005-339933 A     12/2005

* cited by examiner

*Primary Examiner*—Chandrika Prasad
(74) *Attorney, Agent, or Firm*—Sughrue Mion, PLLC

(57) ABSTRACT

A shield shell unit includes a shield shell that is attached to an end portion of a shield member for covering a wire, and an attached portion that is attached to the shield shell. The shield shell includes a shell main body, and a fixing portion which projects from the shell main body and is mounted on the attached portion in a direction of intersecting with a direction of attaching the shield shell to the attached portion when the shield shell is attached to the attached portion. The fixing portion and the attached portion have holes which are communicated with each other for passing a screw member therethrough when the fixing portion is mounted on the attached portion.

6 Claims, 10 Drawing Sheets

SHIELD SHELL UNIT WITH A PROJECTING FIXING PORTION

BACKGROUND

The present invention relates to a shield shell unit including a shield shell attached to an end portion of a shield member for covering a wire, and an attached portion attached with the shield shell.

A various electronic apparatus is mounted on a moving body such as an automobile. The automobile is wired with a wire harness for transmitting power, a control signal or the like to the electronic apparatus. The wire harness includes a plurality of wires and a connector attached to the wire.

Although there is a case in which a three-phase alternating current motor is used as a motor for running for the above-described automobile, for example, running in an electric automobile, a hybrid vehicle, or a fuel cell vehicle, a power at a high voltage is supplied to the motor for running of this kind, and therefore, there poses a problem that an electric noise is leaked from a wire or a terminal metal piece of a connector for supplying a power or the like to the motor to outside, the electric noise flows from the wire or the terminal metal piece to other wire or other terminal metal piece.

A technology for resolving the problem, a structure of fixing a shield wire as shown by, for example, Patent Reference 1 is known. The structure of fixing a shield wire includes a shield member (braided conductor) for covering a wire, a shield shell having a ring-like member, a ring in a shape of an elliptical pillar attached with the shield member and a flange portion provided at an outer edge of the ring, and a strap. The ring-like member is arranged on an inner side of an end portion of the shield member, and the shield member is attached to an inner portion thereof by folding back a front end of the shield member. Further, the shield member is fixed to the shield shell by covering an end portion of the shield member attached with the ring-like member on the ring of the shield shell, arranging the strap on an outer side of the end portion and calking the strap.

FIG. 10 shows a structure 101 for attaching a shield shell of a related art. A shield shell 103 fixed with a shield member as described above is attached to an attached portion 105 arranged in a vertical direction (a strap or a shield member is omitted in FIG. 10). The shield shell 103 is attached to the attached portion 105 by arranging a flange portion 136 on the attached portion 105, communicating four holes 137, 155 respectively provided at the flange portion 136 and the attached portion 105 and screwing screws 106 respectively to the flange portion 136 and the attached portion 105 in a horizontal direction to screw-fasten.

[Patent Reference 1] JP-A-2005-339933

However, a screwing direction is in parallel with a direction of extending the shield member, and therefore, there poses a problem that a screwing operation is difficult to carry out by constituting a hindrance by the shield member, further, when the attached portion is arranged in the vertical direction as shown by FIG. 10, a lower side is difficult to be optically observed, and therefore, there is a case in which the screw is dropped in the screwing operation, and an operability is poor. Further, a number of screw-fastening portions is large, and therefore, a number of operation steps is large, the operation steps are complicated, a number of parts is large and cost is taken.

SUMMARY

It is an object of the invention to resolve the problem. That is, it is an object of the invention to provide a shield shell unit capable of attaching a shield shell to an attached portion with excellent operability and firmly.

In order to achieve the object by resolving the problem, there is provided a shield shell unit, comprising:

a shield shell that is attached to an end portion of a shield member for covering a wire; and an attached portion that is attached to the shield shell, wherein the shield shell includes:

a shell main body; and a fixing portion which projects from the shell main body, and is mounted on the attached portion in a direction of intersecting with a direction of attaching the shield shell to the attached portion when the shield shell is attached to the attached portion; and wherein the fixing portion and the attached portion have holes for passing a screw member therethrough, the holes being communicated with each other when the fixing portion is mounted on the attached portion.

Preferably, the fixing portion projects in an inner direction of the shell main body.

Preferably, the shield shell includes an elastic portion which projects from the shell main body. The elastic portion is brought into contact with the attached portion while elastically deforming when the shield shell is attached to the attached portion so that the elastic portion presses the attached portion in the attaching direction by an elastic recovery force.

Preferably, the attached portion includes a receiving portion which is formed as a recess on an outer surface of the attached portion. The receiving portion positions the elastic portion at an inner portion of the receiving portion when the shield shell is attached to the attached portion.

According to the above configuration, the shield shell includes the shell main body, and the fixing portion provided to project from the shell main body and mounted on the attached portion along the direction of intersecting with the direction of attaching the shield shell to the attached portion when the shield shell is attached to the attached portion. Also, holes which are provided at the fixing portion and the attached portion and communicated with each other when the fixing portion is mounted on the attached portion. The screw member passes through inner portions of the holes. Therefore, the screw member can be screwed to the pair of holes along the direction of intersecting with the attaching direction (that is, a direction of extending the shield member), the shield member or the like does not constitute a hindrance in the screwing operation, and the shield shell can be attached to the attached portion with excellent operability. Further, when the attached portion is arranged in the vertical direction, the attaching direction becomes a horizontal direction, the screw members are screwed into the pair of holes along the vertical direction by mounting the fixing portion on the attached portion along the vertical direction, and therefore, the screw member can be screwed from an upper portion to a lower portion, the screwing operation can firmly be carried out while optically observing the operation. Further, as a secondary effect, the structure of the shield shell is simple, and therefore, the shield shell can be fabricated by pressing or the like and fabrication cost can be reduced.

According to the above configuration, the fixing portion projects to the inner direction of the shell main body. Therefore, when the fixing portion is mounted on the attached portion and is fixed by the screw member, the shell main body is strongly pressed to the attached portion and the shield shell can firmly be attached to the attached portion.

According to the above configuration, the elastic portion projects from the shell main body, elastically deformed by being brought into contact with the attached portion when the shield shell is attached to the attached portion and pressing the attached portion along the attaching direction by the elastic recovery force, and therefore, a gap is not produced between the shield shell and the attached portion by the elastic portion and rattling of the shield shell can be prevented and the shield shell can simply be attached to the attached portion by reducing screwing portions by replacing portions of the screwing portions by the elastic portion.

According to the above configuration, the receiving portion provided to recess from the outer surface of the attached portion for positioning the elastic portion at the inner portion when the shield shell is attached to the attached portion, and therefore, the elastic portion is not rattled on the outer surface of the attached portion and rattling of the shield shell can firmly be prevented.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
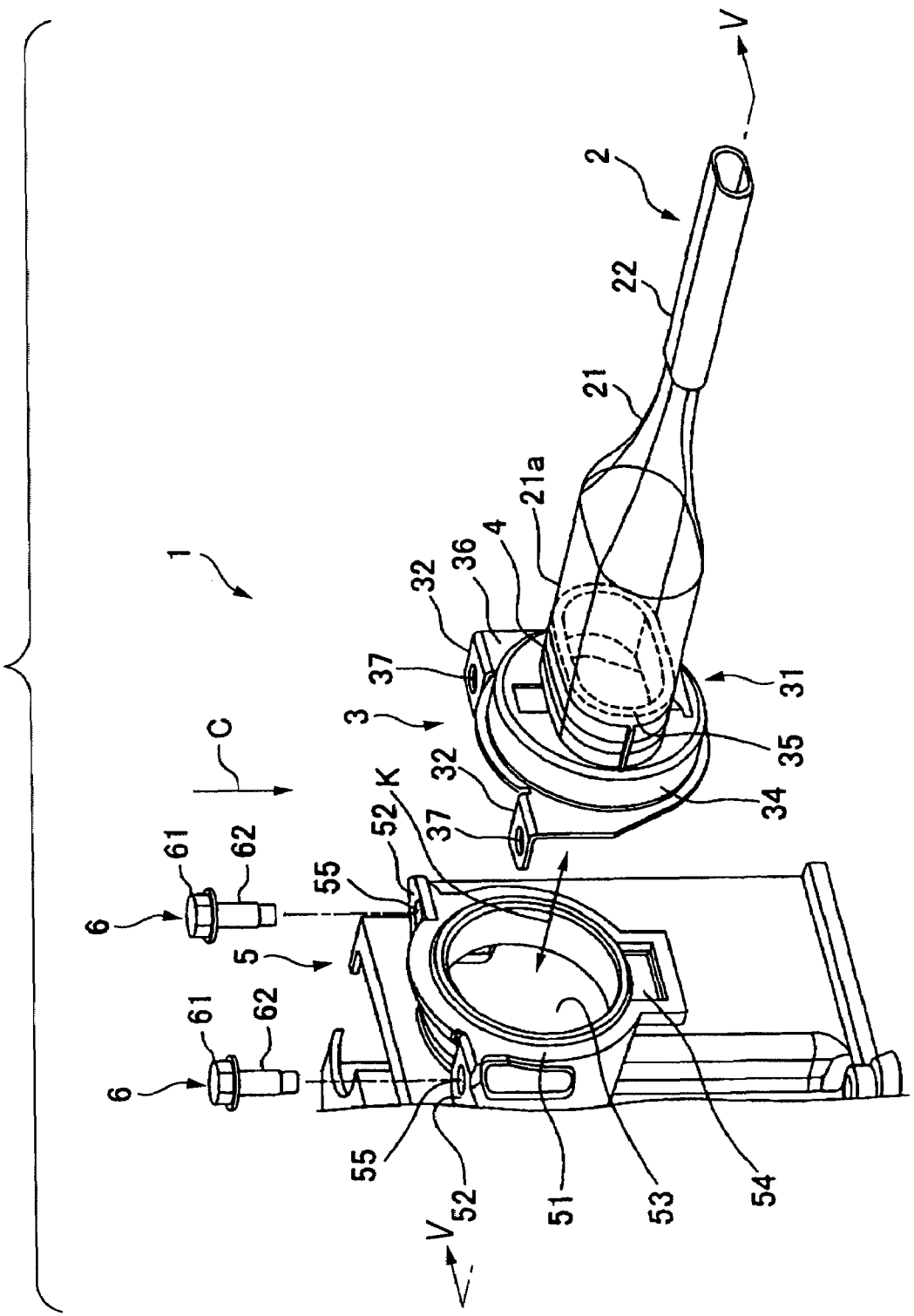
FIG. 1 is a perspective view showing a structure of attaching a shield shell according to a first embodiment of the invention.

A structure of attaching a shield shell according to a first embodiment of the invention will be explained in reference to FIG. 1 through FIG. 6 as follows; A structure 1 of attaching a shield shell according to a first embodiment of the invention includes a shield part 2, a shield shell 3, a shield ring 4, an attached portion 5, and a screw (in correspondence with a screw member) 6 as shown by FIG. 1.

The shield part 2 is provided with a flexibility and formed in a cylindrical shape. As shown by FIG. 1 and the like, the shield part 2 includes a shield braid 21 (in correspondence with a shield member), and an outer sheath 22. The shield braid 21 is formed by braiding strands comprising a conductive metal material or the like and is provided with a flexibility. The shield braid 21 is formed in a cylindrical shape (bag shape) as a whole. A wire (not illustrated) is passed through an inner portion of the shield braid 21.

The wire includes a core line comprising a conductive metal material and a cover portion comprising an insulating synthetic resin or the like. The core line is formed by twisting a plurality of strands. The strand constituting the core line comprises a conductive metal material. Further, the core line may be constituted by one piece of strand. The wire is electrically connected to, for example, an AC/DC converter.

The outer sheath 22 comprises an insulating synthetic resin or the like and is formed in a cylindrical shape (bag shape). The outer sheath 22 covers the shield braid 21. At an end portion of the shield part 2, the shield braid 21 is exposed by removing the outer sheath 22.

The shield braid 21 of the shield part 2 of the above-described constitution passes the wire at inside thereof to cover the wire and is attached to the shield shell 3 in a state of widening an inner diameter of the end portion 21a. Further, the shield braid electrically shields the wire from outside of the shield braid 21.

Figure 2:
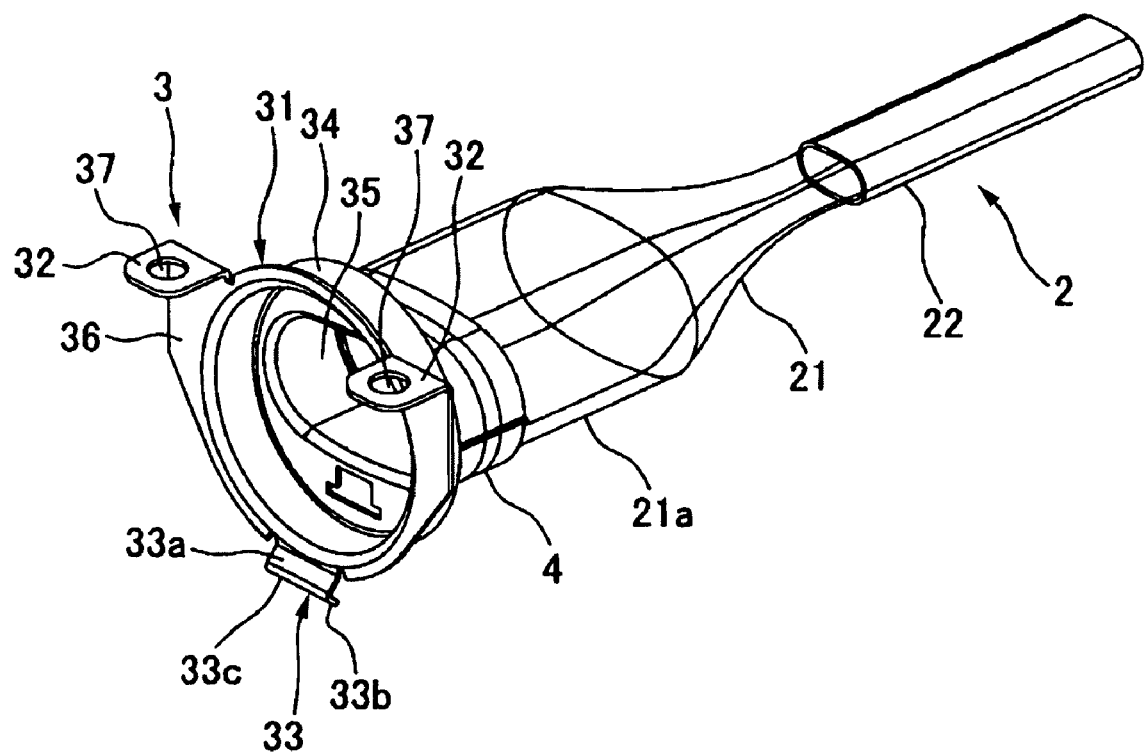
FIG. 2 is a perspective view from other direction of the shield shell attached with a shield braid shown in FIG. 1.
Figure 3:
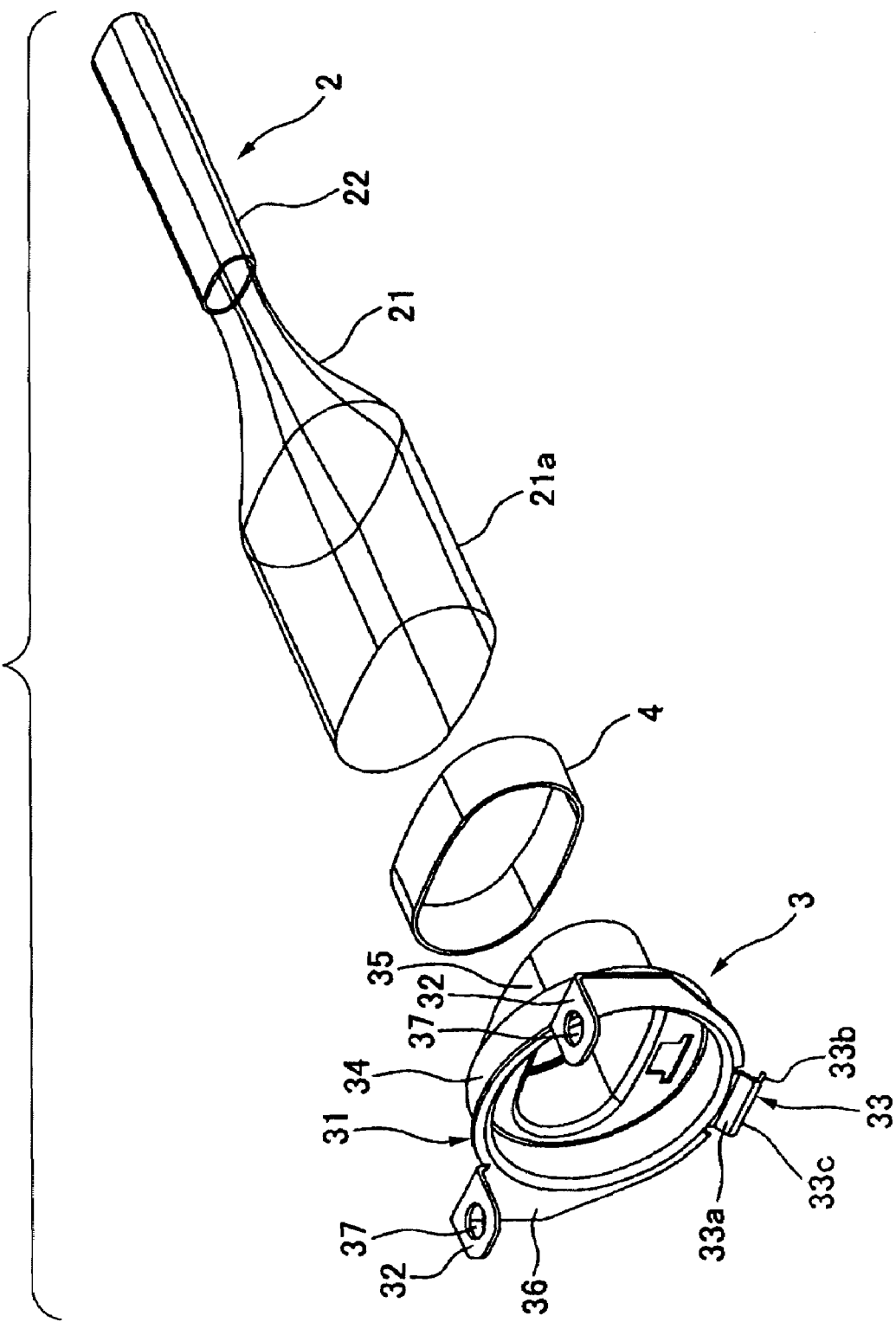
FIG. 3 is a perspective view disassembling to show the shield shell attached with the shield braid shown in FIG. 2.
Figure 4:
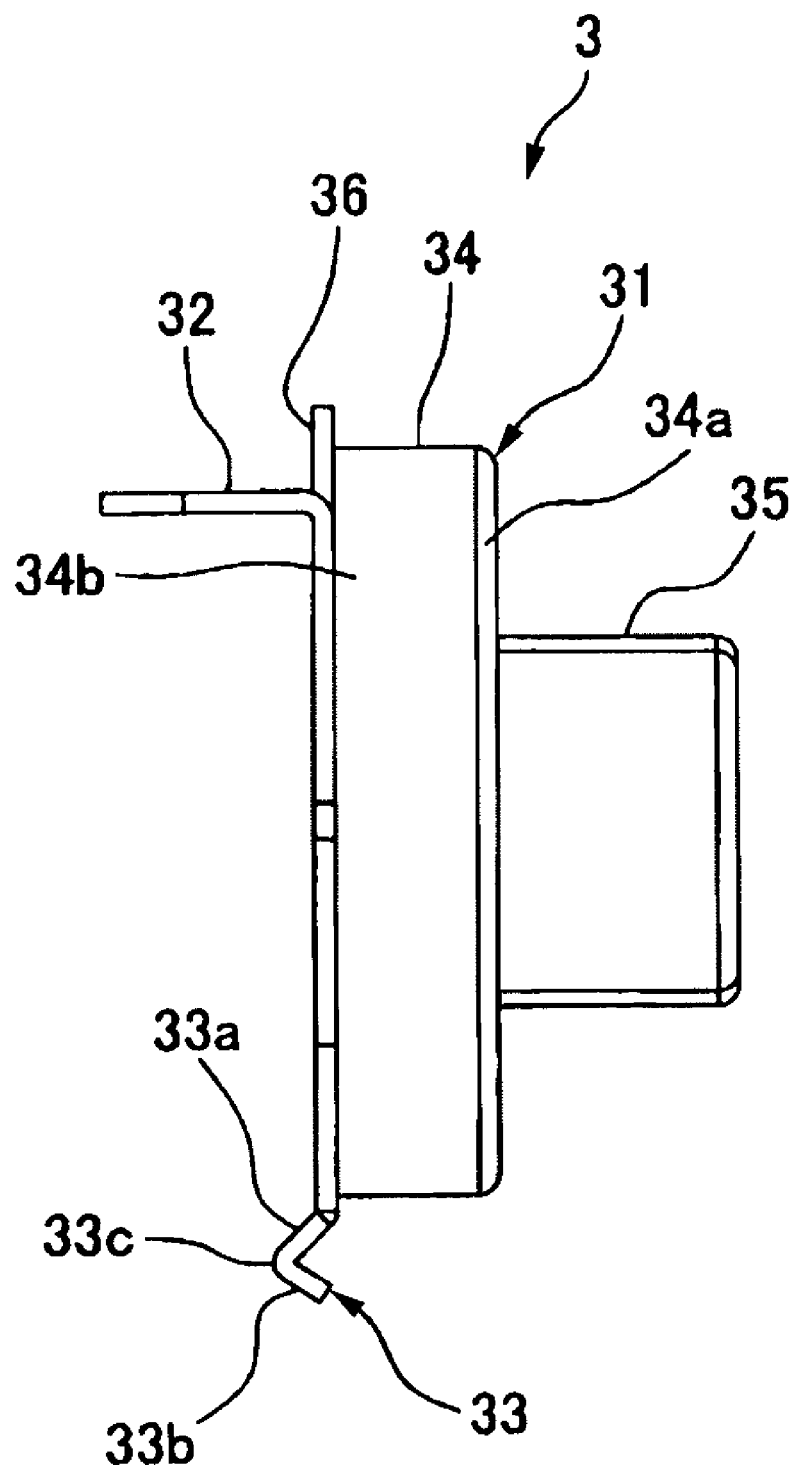
FIG. 4 is a side view of the shield shell shown in FIG. 3.

The shield shell 3 is formed by, for example, pressing a sheet metal or the like. As shown by FIG. 2 and the like, the shield shell 3 is attached to the end portion 21a of the shield braid 21 covering the wire. As shown by FIG. 3 and FIG. 4, the shield shell 3 integrally includes a shell main body 31, and a fixing portion 32 and an elastic portion 33 provided to project from the shell main body 31. The shell main body 31 includes a main body portion 34, a calking portion 35, and a flange portion 36.

The main body portion 34 is formed substantially in a circular cylinder shape. The calking portion 35 is continuous to one end portion 34a of the main body portion 34 (FIG. 4) and is formed by a shape of an elliptical cylinder. The main body portion 34 and the calking portion 35 are arranged coaxially with each other, that is, in series. An outer diameter of the main body portion 34 is larger than an outer diameter of the calking portion 35. An outer peripheral face of the calking portion 35 is covered by the end portion 21a the diameter of which is widened of the shield braid 21, and the wire is passed into the main body portion 34 and the calking portion 35. The flange portion 36 is projected in an outer direction of the main body portion 34 from an outer edge on a side of other end portion 34b (FIG. 4) of the main body portion 34. The flange portion 36 is provided over substantially an entire periphery of the outer edge.

A plane-shape of the fixing portion 32 is formed by a shape of a plate piece substantially in a rectangular shape. The fixing portion 32 is continuous to the flange portion 36, orthogonal to the flange portion 36 and projected in a direction of being remote from the calking portion 35. A pair of the fixing portions 32 are provided by being spaced apart from each other by an interval therebetween. When the shield shell 3 is attached to the attached portion 5, the fixing portion 32 is mounted on the attached portion 5 along a direction C orthogonal to a direction K of attaching the shield shell 3 to the attached portion 5.

'Direction K of attaching the shield shell 3 to the attached portion 5' (hereinafter, simply referred to as 'attaching direction K') is a direction expressed by an arrow mark K in FIG. 1 and coincides with a horizontal direction according to the embodiment. Further, 'direction C orthogonal to the attaching direction K' is a direction expressed by an arrow mark C in FIG. 1 and coincides with a vertical direction according to the embodiment.

The pair of fixing portion 32 each is provided with a single one hole 37 of pairs of holes 37 and 55. A total of two of the one holes 37 are provided in the illustrated example. The one hole 37 is formed by a circular shape in a plane shape thereof and penetrates the fixing portion 32.

The elastic portion 33 is provided on a side opposed to the fixing portion 32 by interposing an axis center of the shell main body 31 (lower side of the fixing portion 32). The elastic portion 33 includes a first piece 33a continuous to the other end portion 34b of the main body portion 34 and projected in an outer direction of the main body portion 34 and in a direction of being remote from the main body portion 34, a second piece 33b continuous to a front end of the first piece 33a and projected in an outer direction of the main body portion 34 and in a direction of being proximate to the main body portion 34, and a fold-to-bend portion 33c constituting a portion of connecting the first piece 33a and the second piece 33b and is formed in an L-like shape in a section thereof. The fold-to-bend portion 33c is arranged on a side of being remote from the calking portion 35 more than the other end portion 34b of the main body portion 34.

Figure 6:
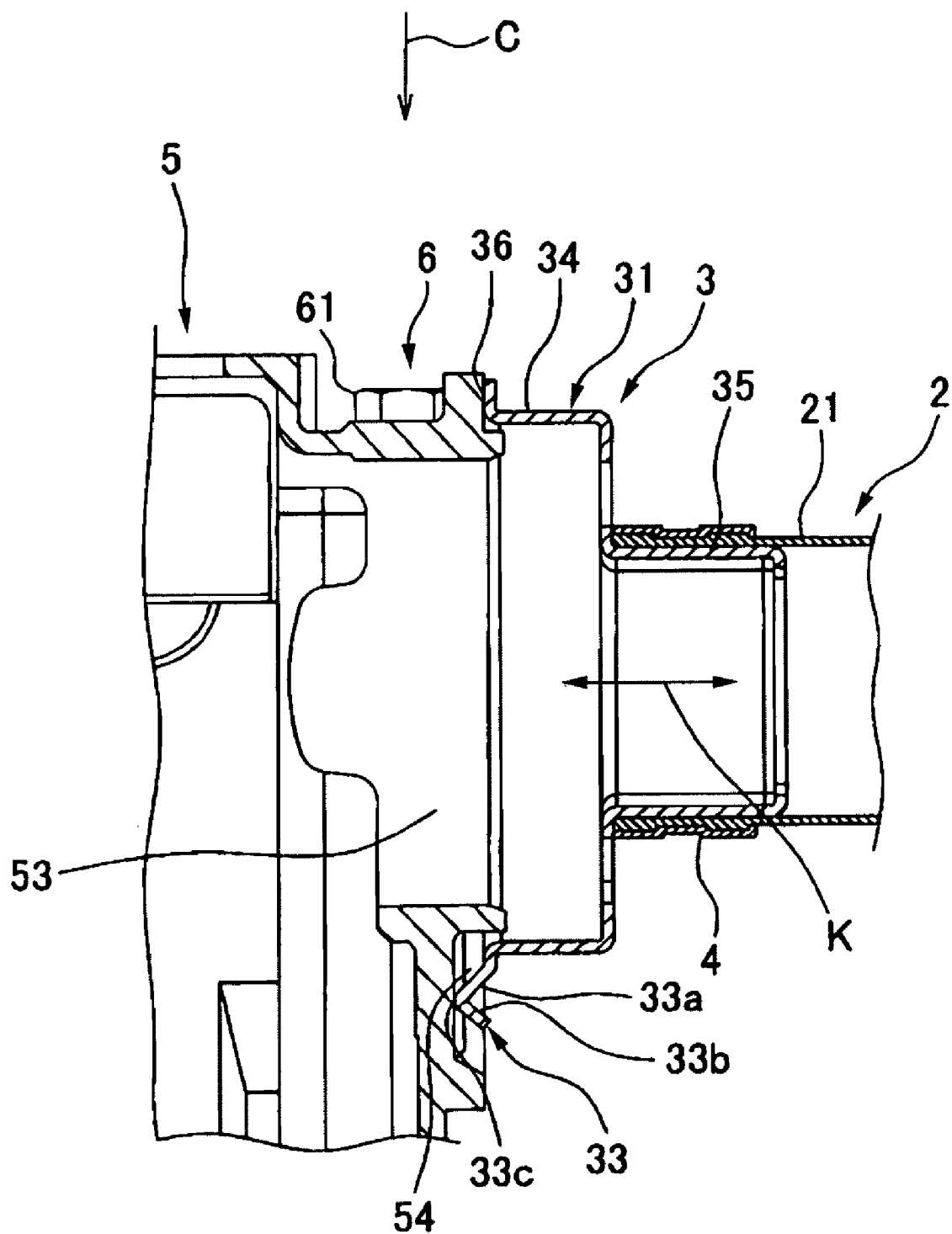
FIG. 6 is a sectional view showing a state of attaching the shield shell shown in FIG. 5 to the attached portion.

According to the elastic portion 33 of the above-described constitution, when the shield shell 3 is attached to the attached portion 5, the so-to-bend portion 33c is arranged in a horizontal direction and is brought into contact with an elastic portion receiving portion 54, mentioned later, of the attached portion 5 and the first piece 33a is elastically deformed in a direction of being proximate to the calking portion 35. Thereafter, as shown by FIG. 6, by an elastic recovery force of the first piece 33a, the fold-to-bend portion 33c presses the elastic portion receiving portion 54 along the attaching direction K.

The shield ring 4 comprises a conductive metal material and is formed by bending a sheet metal or the like in a shape of a strip in a ring-like shape as shown by FIG. 3 and the like. An inner diameter of the shield ring 4 is larger than a total of a thickness of doubling a thickness of the end portion 21a of the shield braid 21 and an outer diameter of the calking portion 35 of the shield shell 3. The shield ring 4 is attached to an outer side of the calking portion 35 covered with the end portion 21a of the shield braid 21, and positions the end portion 21a between the shield ring 4 and the calking portion 35. Further, by calking the shield ring 4, the shield ring 4 is contracted in a diameter thereof, the end portion 21a is interposed between an inner face of the shield ring 4 and an outer peripheral face of the calking portion 35, and the shield shell 3 is attached to the shield braid 21.

The attached portion 5 is, for example, an outer wall arranged on a vertical direction of a shield case and is formed by a conductive metal material. For example, a three-phase alternating current AC motor is contained in the shield case, and a power from an AC/DC converter is supplied to the motor by way of a wire covered by the shield braid 21. As shown by FIG. 1, the attached portion 5 includes an attached face 51 and a fixing portion receiving face 52.

The attached face 51 is a portion of an outer surface of the attached portion 5 and is arranged in a vertical direction. When the shield shell 3 is attached to the attached portion 5, the flange portion 36 of the shield shell 3 is arranged on the attached face 51. The attached face 51 is provided with a wire passing hole 53 and the elastic portion receiving portion 54.

The wire passing hole 53 is provided by penetrating the attached face 51 (attached portion 5). The wire passing hole 53 is formed by a circular shape in a plane shape thereof and an inner diameter thereof is more or less smaller than an inner diameter of the main body portion 34 of the shield shell 3. When the shield braid 21 covers the wire and the shield shell 3 attached with the shield braid 21 is attached to the attached portion 5, the wire is passed to the wire passing hole 53.

The elastic portion receiving portion 54 is provided to be recessed from the attached face 51, and a plane shape thereof is formed substantially by a rectangular shape. A width in a horizontal direction of the elastic portion receiving portion 54 is provided to be slightly larger than a width of the elastic portion 33 of the shield shell 3 (length of the fold-to-bend portion 33c). When the shield shell 3 is attached to the attached portion 5, the elastic portion 33 is positioned at inside of the elastic portion receiving portion 54. A bottom face of the elastic portion receiving portion 54 (inner face in parallel with a vertical direction) is brought into contact with the fold-to-bend portion 33c of the elastic portion 33 as described above and is pressed along the attaching direction K by the fold-to-bend portion 33c.

The fixing portion receiving face 52 is a portion of the outer surface of the attached portion 5, continuous to an upper end of the attached face 51 and arranged in the horizontal direction. When the shield shell 3 is attached to the attached portion 5, the fixing portion 32 of the shield shell 3 is mounted on the fixing portion receiving face 52 as described above. The fixing portion receiving face 52 is provided with the other hole 55 of the pair of holes 37 and 55.

The other hole 55 is formed by a circular shape in a plane shape thereof and is provided along the direction C orthogonal to the attaching direction K from the fixing portion receiving face 52. The other hole 55 is provided in correspondence with the one hole 37 of the fixing portion 32 and a total of two thereof are provided in the illustrated example. An inner face of the other hole 55 is provided with a screw groove. When the fixing portion 32 is mounted on the fixing portion receiving face 52, the other hole 55 is communicated with the one hole 37 provided at the fixing portion 32 and the screws 6 are passed into the pairs of communicated holes 37 and 55.

The shield shell 3 is attached to the attached portion 5 of the above-described constitution. When the shield shell 3 is attached to the attached portion 5, electric noise leaked from the wire to outside and electric noise flowing into an inner portion thereof are grounded successively by way of the shield braid 21, the shield shell 3 and the attached portion 5.

The screw 6 is integrally provided with a shaft portion 61 and a head portion 62 formed at one end of the shaft portion 61 as shown by FIG. 1 and the like. An outer peripheral face of the shaft portion 61 is formed with a screw groove. When the fixing portion 32 of the shield shell 3 is mounted on the fixing portion receiving face 52 of the attached portion 5 and the pairs of holes 37 and 55 are communicated, the shaft portions 61 are passed through the pairs of communicated holes 37 and 55 and screwed into the pairs of holes 37 and 55. The shaft portions 61 are passed into the pairs of holes 37 and 55 from sides (upper sides) of the fixing portions 32 along the direction C orthogonal to the attaching direction K to sides (lower sides) of the fixing portion receiving face 52 and front end sides of the shaft portions 61 are positioned at inside of the attached portion 5. By screwing the screws 6 into the pairs of holes 37 and 55, the fixing portions 32 are interposed between the head portions 62 and the attached faces 51 to fix and the shield shell 3 is fixed to the attached portion 5.

In the structure 1 of attaching the shield shell having the above-described constitution, when the shield shell 3 is attached to the attached portion 5, first, as shown by FIG. 2, the end portion 21a of the shield braid 21 is widened to cover the calking portion 35 of the shield shell 3, the shield ring 4 is attached to the outer side of the calking portion 35 covered with the shield braid 21, thereby, the shield ring 4 is calked and the shield braid 21 is attached to the shield shell 3.

Figure 5:
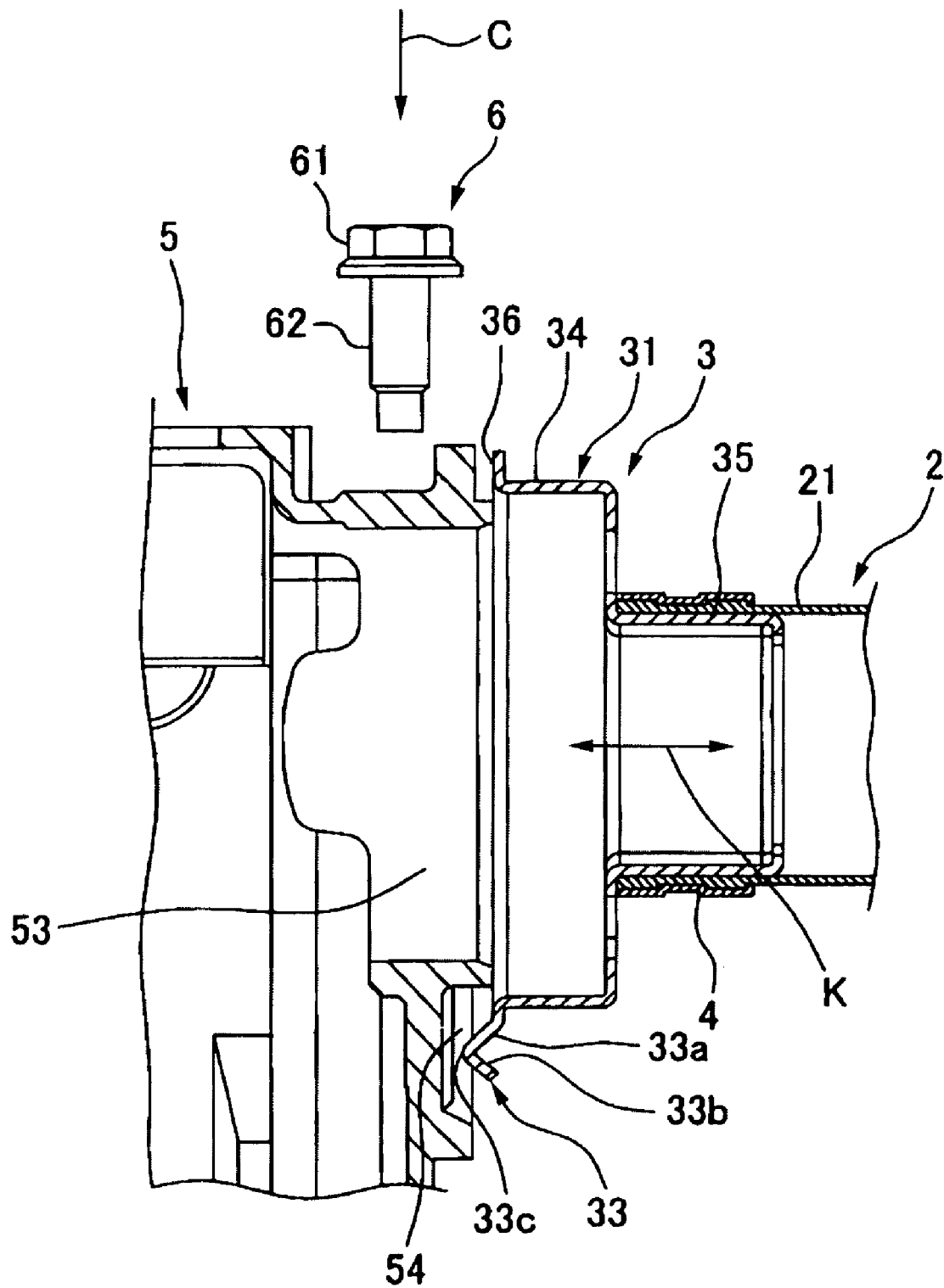
FIG. 5 is a sectional view taken along a line V-V of FIG. 1 showing a state immediately before attaching the shield shell shown in FIG. 1 to an attached portion.

Further, as shown by FIG. 5, the shield shell 3 is made to be proximate to the attached portion 5, the flange portion 36 is arranged on the attached face 51 of the attached portion 5 and the fixing portion 32 is mounted on the fixing portion receiving face 52. Then, the pairs of holes 37 and 55 are communicated, as shown by FIG. 6, the screws 6 are screwed to the pairs of holes 37 and 55 communicated with each other from the upper side to the lower side, and the shield shell 3 is attached to the attached portion 5. At this occasion, the elastic portion 33 is disposed at inside of the elastic portion receiving portion 54, the elastic portion 33 is brought into contact with the bottom face of the elastic portion receiving portion 54 and elastically deformed and presses the bottom face by the elastic recovery force.

According to the embodiment, the shield shell 3 includes the shell main body 31, and the fixing portion 32 provided to project from the shell main body 31 and mounted on the attached portion 5 along the direction C orthogonal to the attaching direction K when the shield shell 3 is attached to the attached portion 5 and includes the pairs of holes 37 and 55 provided to the fixing portions 32 and the attached portion 5, communicated with each other when the fixing portion 32 is attached to the attached portion 5 and passing the screws 6 at inner portions thereof, and therefore, the screws 6 can be screwed into the pairs of holes 37 and 55 along the direction C orthogonal to the attaching direction K (that is, direction of extending the shield braid 21), the shield braid 21 or the like does not constitute a hindrance in the screwing operation, and the shield shell 3 can be attached to the attached portion 5 with an excellent operability. Further, the attached portion 5 is arranged in the vertical direction, the fixing portions 32 are mounted on the attached portion 5 along the direction C orthogonal to the attaching direction K, that is, the vertical direction, the screws 6 are screwed into the pairs of holes 37 and 55 along the vertical direction, and therefore, the screws 6 can be screwed from the upper side to the lower side, and the screwing operation can firmly be carried out while optically observing the operation.

The elastic portion 33 is provided to project from the shell main body 31, elastically deformed by being brought into contact with the attached portion 5 when the shield shell 3 is attached to the attached portion 5 and pressing the attached portion 5 from the attaching direction K by the elastic recovery force. Therefore, a gap is not produced between the shield shell 3 and the attached portion 5 by the elastic portion 33 and rattling of the shield shell 3 can be prevented, and the shield shell can simply be attached to the attached portion 5 by reducing screw portions by replacing portions of the screw portions by the elastic portion 33.

The elastic portion receiving portion 54 is provided to recess from the attached face 51 of the attached portion 5 for positioning the elastic portion 33 at the inner portion when the shield shell 3 is attached to the attached portion 5. Therefore, the elastic portion 33 is not rattled on the attached face 51 and rattling of the shield shell 3 can firmly be prevented.

According to the embodiment, the fixing portion 32 is mounted on the attached portion 5 from the direction C orthogonal to the attaching direction K. However, according to the invention, it is not necessarily needed that the direction C is orthogonal to the attaching direction K and the direction C may be a direction intersecting with the attaching direction K.

Further, according to the embodiment, the attached face 51 is arranged in the vertical direction. However, according to the invention, the attached face 51 may be arranged in any direction, for example, the attached face 51 may be arranged in the horizontal direction. In this case, the attaching direction K becomes the vertical direction, and the screws 6 are passed to the pairs of holes 37 and 55 in the horizontal direction.

Further, according to the embodiment, the screw member is the screw 6. However, according to the invention, the screw member may be constituted by, for example, a bolt and a nut.

Next, the structure 1 of attaching a shield shell according to a second embodiment of the invention will be explained in reference to FIG. 7 through FIG. 9. Further, constituent portions the same as those of the above-described first embodiment are attached with the same notations and an explanation thereof will be omitted.

Figure 7:
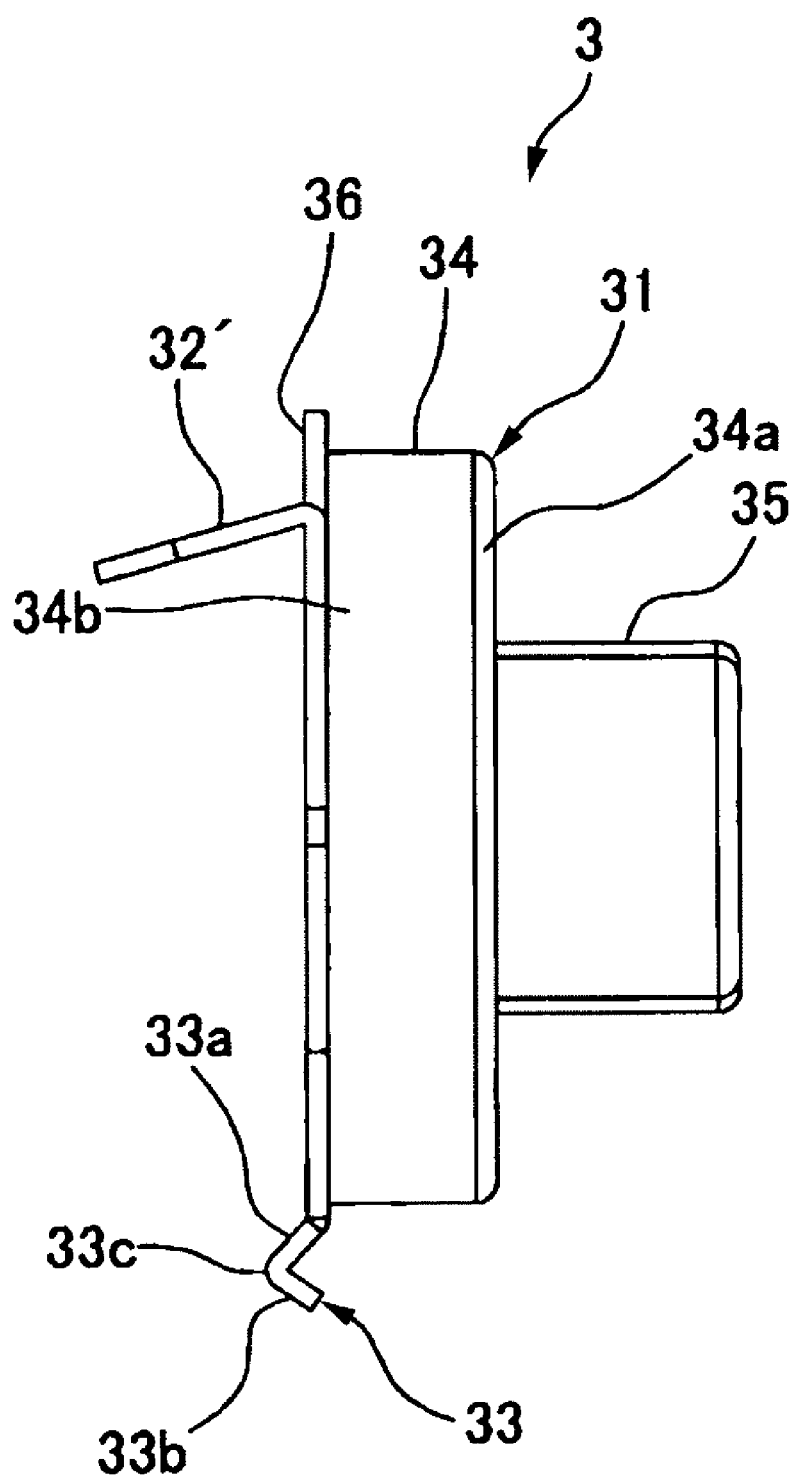
FIG. 7 is a side view of a shield shell of a structure of attaching a shield shell according to a second embodiment of the invention.
Figure 8:
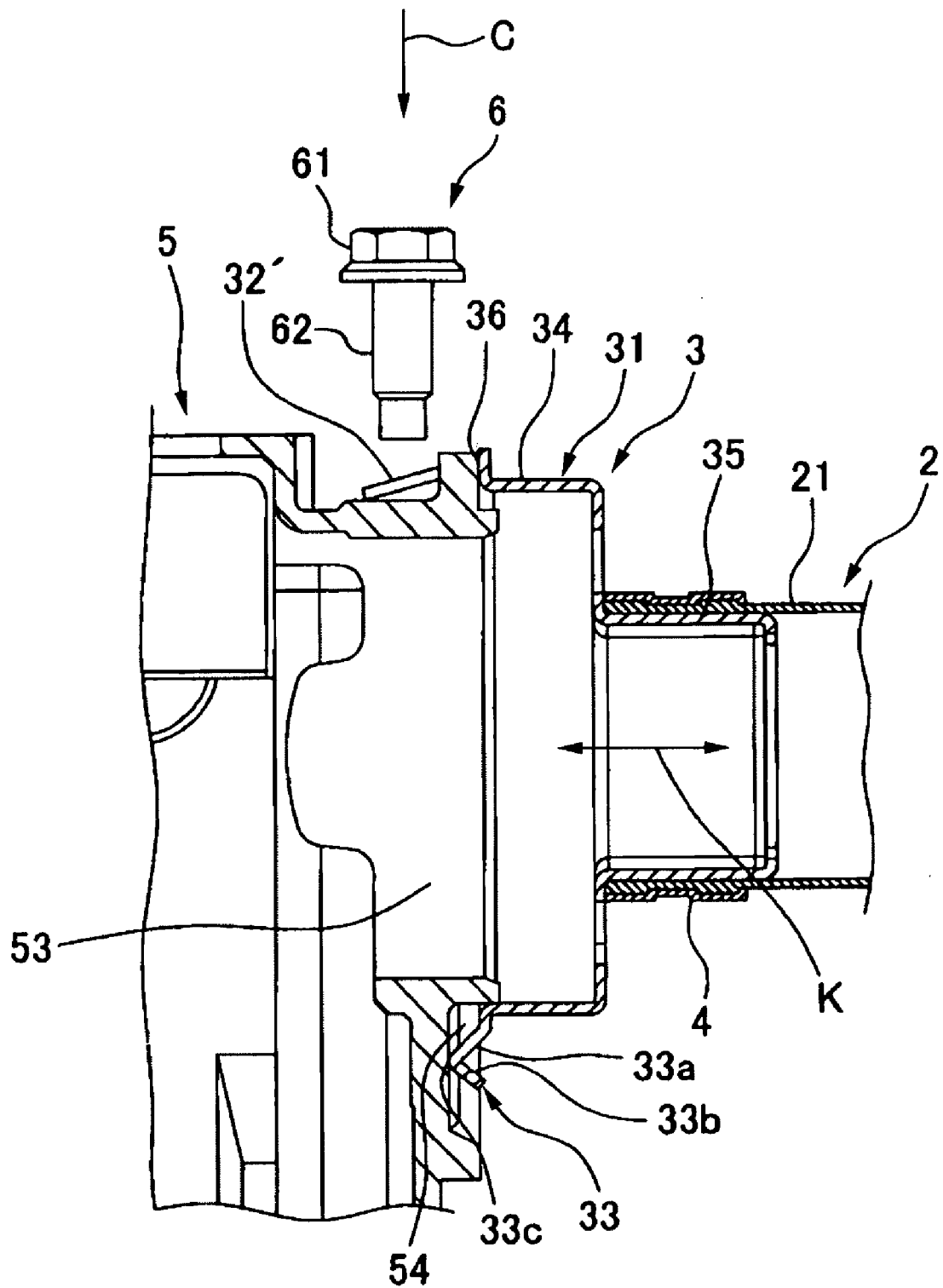
FIG. 8 is a sectional view showing a state immediately before attaching the shield shell shown in FIG. 7 to an attached portion.

According to the shield shell 3 of the structure 1 of attaching the shield shell according to the second embodiment of the invention, as shown by FIG. 7, a fixing portion 32' is provided to project in an inner direction of the shell main body 31. That is, the fixing portion 32' is continuous to the flange portion 36 and provided to project in a direction of being remote from the calking portion 35 such that an angle thereof made by the fixing portion 32' and the flange portion 36 becomes an acute angle.

When the shield shell 3 of the above-described constitution is attached to the attached portion 5, the flange portion 36 is arranged to the attached face 51 of the attached portion 5 and the fixing portion 32' is mounted on the fixing portion receiving face 52. The fixing portion 32' is projected to the inner direction of the shell main body 31, and therefore, as shown by FIG. 8, when the flange portion 36 is arranged to the attached face 51, the fixing portion 32' is mounted on the fixing portion receiving face 52 in a state of being skewed in which a front end side thereof is proximate to the fixing portion receiving face 52 and a base end side thereof is remote from the fixing portion receiving face 52.

Figure 9:
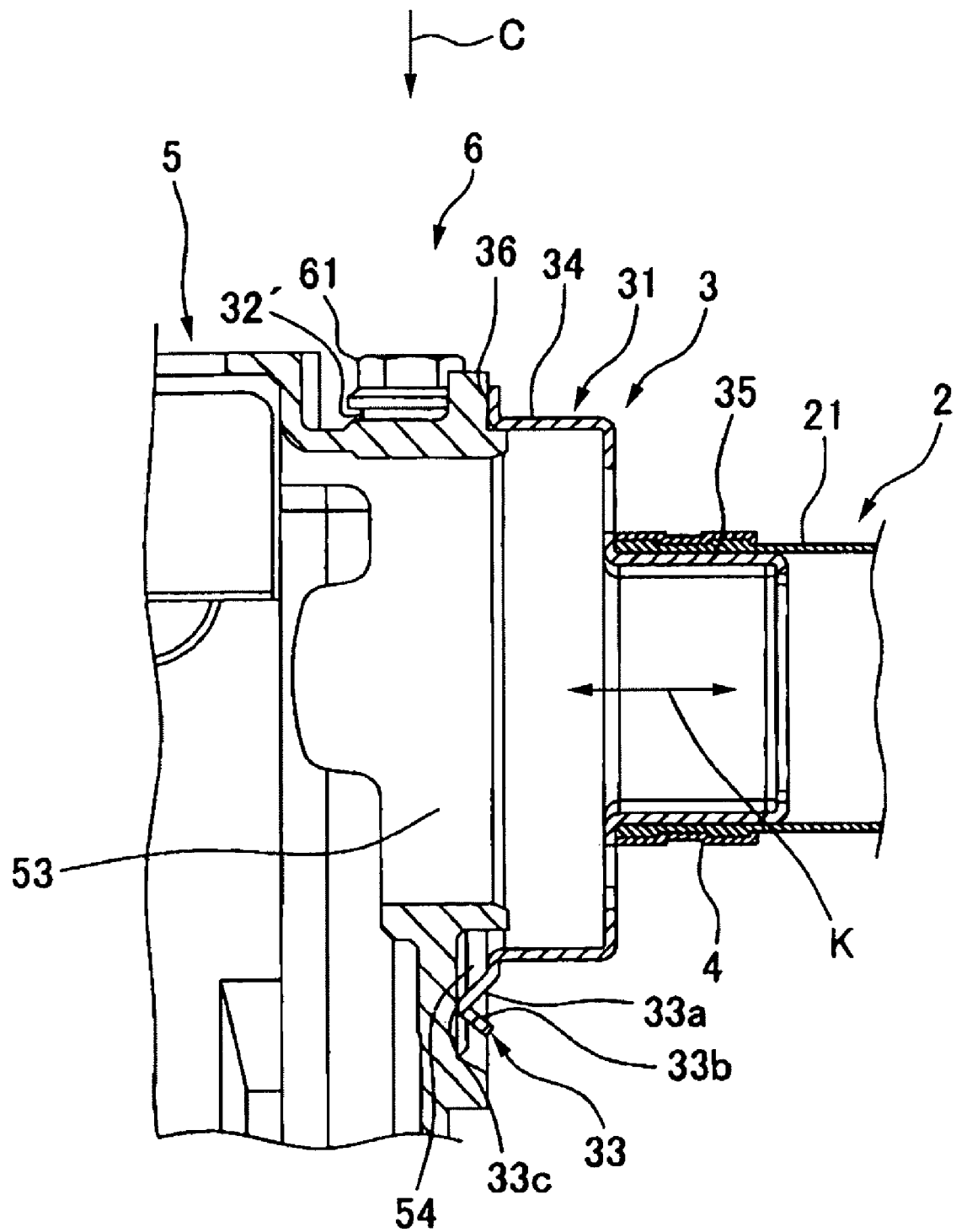
FIG. 9 is a sectional view showing a state of attaching the shield shell shown in FIG. 8 to the attached portion.
Figure 10:
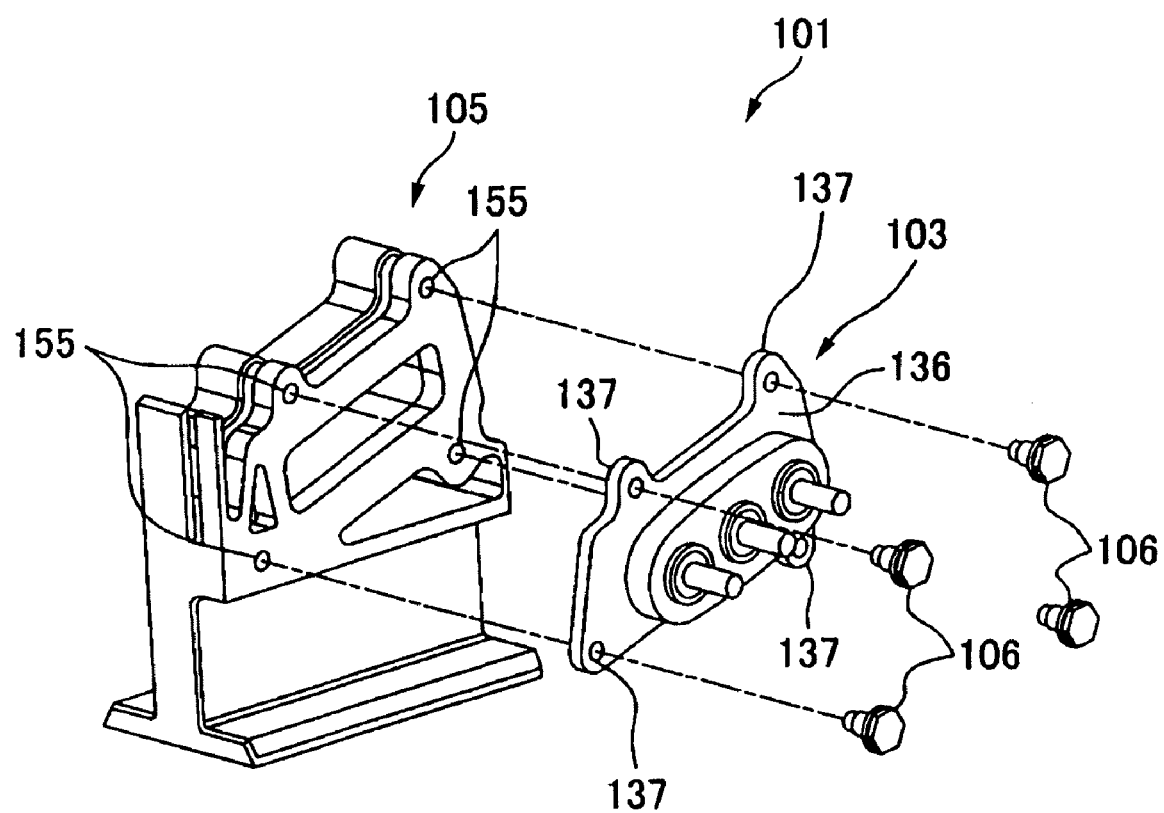
FIG. 10 is a perspective view showing a structure of attaching a shield shell of a related art.

Further, when the screws 6 are screwed to the pairs of communicated holes 37 and 55, as shown by FIG. 9, the base end side of the fixing portion 32' is proximate to the fixing portion receiving face 52 and the fixing portion 32' is mounted on the fixing portion receiving face 52 in the horizontal state, the flange portion 36 is strongly pressed to the attached face 51 and the elastic portion 33 is strongly pressed to the bottom face of the elastic portion receiving portion 54 to be elastically deformed and strongly presses the bottom face by an elastic recovery force and the shield shell 3 is attached to the attached portion 5 by the screw 6. That is, in comparison with the first embodiment, the shield shell 3 is further firmly attached to the attached portion 5.

According to the second embodiment, in addition to the effect of the first embodiment, the fixing portion 32' is provided to project in the inner direction of the shell main body, and therefore, the shell main body 31 is strongly pressed to the attached portion 5 when the fixing portion 32' is mounted on the attached portion 5 and fixed by the screws 6, and the shield shell 3 can firmly attached to the attached portion 5.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-296220 filed on Nov. 15, 2007, the contents of which are incorporated herein for reference.

What is claimed is:

1. A shield shell unit, comprising:
a shield shell that is attached to an end portion of a shield member for covering a wire; and
an attached portion that is attached to the shield shell,
wherein the shield shell includes:
a shell main body; and
a fixing portion which projects from the shell main body, and is mounted on the attached portion in a direction of intersecting with a direction of attaching the shield shell to the attached portion when the shield shell is attached to the attached portion; and
wherein the fixing portion and the attached portion have holes for passing a screw member therethrough, the holes being communicated with each other when the fixing portion is mounted on the attached portion.

2. The shield shell unit according to claim 1, wherein the fixing portion projects in an inner direction of the shell main body.

3. The shield shell unit according to claim 1, wherein the shield shell includes an elastic portion which projects from the shell main body; and
wherein the elastic portion is brought into contact with the attached portion while elastically deforming when the shield shell is attached to the attached portion so that the elastic portion presses the attached portion in the attaching direction by an elastic recovery force.

4. The shield shell unit according to claim 3, wherein the attached portion includes a receiving portion which is formed as a recess on an outer surface of the attached portion; and
wherein the receiving portion positions the elastic portion at an inner portion of the receiving portion when the shield shell is attached to the attached portion.

5. A shield shell unit, comprising:
a shield shell that is attached to an end portion of a shield member for covering a wire; and
an attached portion that is attachable to the shield shell,
wherein the attached portion comprises an attached face, and a fixing portion receiving face that is orthogonal to the attached face;
wherein the shield shell comprises:
a flange portion that abuts against the attached face when the shield shell is attached to the attached portion;
a fixing portion that is orthogonal to the flange portion, wherein the fixing portion abuts against the fixing portion receiving face when the shield shell is attached to the attached portion;
wherein the fixing portion and the fixing portion receiving face have holes for passing a fastener therethrough, the holes being communicated with each other when the fixing portion is mounted on the attached portion.

6. The shield shell unit according to claim 5, wherein the shield shell further comprises an elastic portion which projects from the flange portion; and
wherein the attached portion further comprises an elastic portion receiving portion;
wherein the elastic portion protrudes through the elastic portion receiving portion when the shield shell is attached to the attached portion.

* * * * *